Jan. 29, 1957  F. DI TRAPANI  2,779,266
STEAK BROILER
Filed June 10, 1954
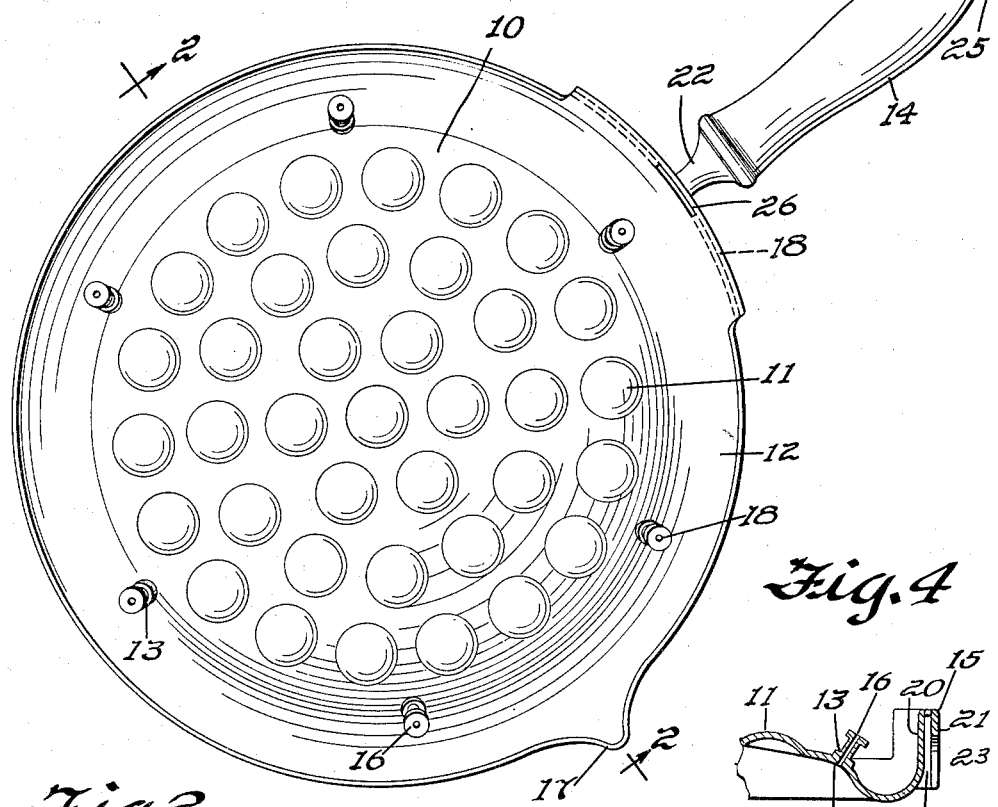
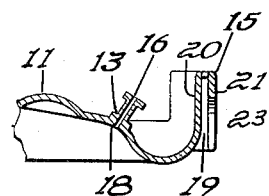
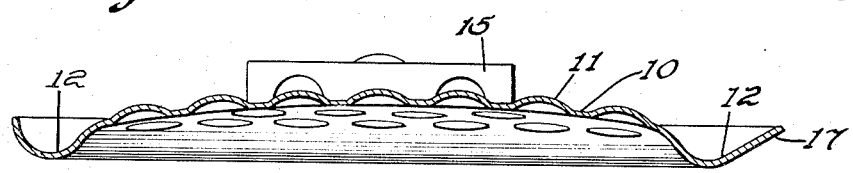
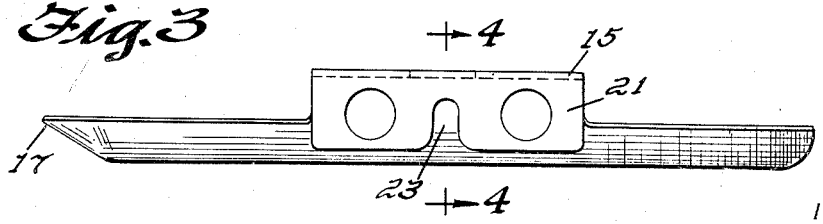
INVENTOR.
Frank Di Trapani
BY Victor J. Evans & Co.
ATTORNEYS

United States Patent Office 2,779,266
Patented Jan. 29, 1957

2,779,266
STEAK BROILER
Frank Di Trapani, Boston, Mass.

Application June 10, 1954, Serial No. 435,702

1 Claim. (Cl. 99—425)

This invention relates to cooking utensils particularly adapted for broiling steaks, and in particular, a broiler comprising a circular upwardly bowed sheet of material having spaced raised mushroom-like nodes extended continuously throughout the intermediate portion with a continuous trough extended around the periphery and with spaced posts having vertically disposed openings therethrough spaced at the inner edge of the trough to facilitate distribution of heat and which also provide means for turning or rotating the broiler.

The purpose of this invention is to provide a broiler in which juices of a steak are sealed within the steak.

The object of this invention is, therefore, to provide an improved broiler particularly adapted for steaks wherein means is provided for sealing juices within the steaks.

Another object of the invention is to provide a broiler in which spaced posts having openings therethrough provide even distribution of heat wherein steaks broiled thereon are tenderized and the juices containing the proteins and vitamins are retained therein.

A further object of the invention is to provide an improved broiler in which fats when liquified run through a continuous trough at the sides and in which the broiler is of a simple and economical construction.

With these and other objects and advantages in view, the invention embodies a circular sheet of material having an upwardly bowed or crowned intermediate surface with a continuous trough formed in the periphery and with spaced raised elements or nodes in the intermediate surface.

Other features and advantages of the invention will appear from the following description taken in connection with the drawings, wherein:

Figure 1 is a plan view of the improved broiler.

Figure 2 is a cross section through the broiler taken on line 2—2 of Figure 1.

Figure 3 is a side elevational view of the broiler looking toward a side upon which a handle may be connected.

Figure 4 is a cross section through the portion of the broiler to which the handle is connected, said section being taken on line 4—4 of Figure 3 and the intermediate portion of the broiler being broken away.

Referring now to the drawings wherein like reference characters denote corresponding parts, the improved broiler of this invention includes a sheet of material formed to provide a circular intermediate portion or base 10 with spaced nodes or shoulders 11 extended upwardly from the intermediate portion, with a continuous trough 12 extended around the periphery, with spaced posts 13 extended upwardly from the outer portion, and with a handle 14 removably mounted in a U-shaped clip 15 at one side.

The intermediate portion of the broiler is bowed upwardly as shown in Figure 2 and the raised portions or nodes 11 extend upwardly from the intermediate portion providing elevated supporting points whereby products positioned on the broiler are suspended in spaced relation to the surface of the intermediate portion 10.

With the broiler formed in this manner, products, and particularly steaks, positioned on the nodes 11 are adapted to be broiled with heat circulating upwardly through the posts whereby the smoke is carried away and the smoke or burning taste reduced to a minimum.

It will be understood that the raised portions or nodes 11 may be of any suitable shape or design and the distances between the nodes may be increased or decreased as may be desired.

The posts 13, which extend upwardly from the material of the broiler, are provided with openings 18 and the upper ends are formed with heads 16 by which the posts may be engaged by the handle to facilitate rotating the broiler on the burner whereby steaks thereon are adapted to be moved from one position to another so that the steaks are more accessible to the cook and accordingly the steaks may be removed and replaced independently. The posts are provided with the vertically disposed openings 18 to provide even distribution of heat.

As illustrated in Figures 2 and 4, the trough 12 is formed inside of the peripheral edge and a spout 17 is provided at one point to facilitate pouring liquified fat which flows from steaks broiled on the device into the trough 12.

The handle 14 is provided with an arcuate plate, as indicated by the dotted lines in Figure 1, and the plate is adapted to slide into a slot 19 between an inner wall 20 and an outer wall 21 of the clip 15. The handle is provided with a stem 22 on which the plate 18 is mounted and the stem is adapted to be positioned in a notch 23 in the outer wall or flange 21 of the clip. The plate 18 may be secured to the handle 14 with a bolt 24 that is adapted to extend through the handle and the extended end of the bolt may be provided with a nut 25, as shown in Figure 1. The upper portion of the clip 15 is provided with an opening 26 through which a projection on the plate of the handle extends to facilitate retaining the broiler in a horizontal position.

With a broiler as disclosed and described, the broiler is first heated and, with the surface of the broiler hot, steaks placed thereon are immediately sealed whereby the juices are retained in the steaks, thereby retaining the proteins and vitamins and improving the taste. Retaining the juices in the steak also tenderizes the steak and eliminates substantially all taste of smoke. After being cooked on one side, the steaks are turned and the juices sealed in the opposite side in the same manner.

The handle may be inserted in the clip 15 to position the broiler in broiling relation with a burner or the like and after the broiler is in position the handle may be removed. The handle is adapted to be reinserted in the clip when it is desired to remove the broiler.

With the parts designed and assembled as shown and described, a broiler is provided that is particularly adapted for a plurality of steaks. It is preferred to position the steaks between the posts 13 and with the broiler rotated by the posts one steak may be removed as another is placed on the broiler.

The improved broiler of this invention may be positioned over a burner or fire, below a burner, or in an oven of the type having an upper burner, and as steaks or other products on the broiler are broiled they are turned over and broiled on the opposite side wherein juices inherent therein are sealed in the steaks.

By this means steaks are broiled with the natural flavors and vitamins retained therein.

It will be understood that modifications, within the scope of the appended claims, may be made in the design and arrangement of the parts without departing from the spirit of the invention.

What is claimed is:

In a broiler, a circular base, a plurality of shoulders extending upwardly from said base and arranged in spaced apart relation with respect to each other, each of said shoulders having a curved shape, the intermediate portion of the base being bowed upwardly, the outer periphery of said base terminating in a continuous trough, a plurality of spaced, parallel posts extending upwardly from said base and arranged contiguous to the inner edge of the trough, each of said posts being provided on its upper end with an enlarged cylindrical head, there being an aperture in each of said heads, a spout arranged on the outer periphery of said base, and a handle detachably connected to said base.

References Cited in the file of this patent

UNITED STATES PATENTS

| | | |
|---|---|---|
| 403,407 | Armour | May 14, 1889 |
| 430,984 | Benvenisti | June 24, 1890 |
| 2,618,258 | Kroyer | Nov. 18, 1952 |

FOREIGN PATENTS

| | | |
|---|---|---|
| 12,106 | Great Britain | Sept. 7, 1887 |